(12) United States Patent
Wu et al.

(10) Patent No.: US 7,753,702 B2
(45) Date of Patent: Jul. 13, 2010

(54) CARD SOCKET ASSEMBLY

(75) Inventors: Xi-Qiu Wu, Shenzhen (CN); Cong-Ling Xiao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/506,341

(22) Filed: Jul. 21, 2009

(65) Prior Publication Data

US 2010/0099283 A1   Apr. 22, 2010

(30) Foreign Application Priority Data

Oct. 20, 2008   (CN) .................. 2008 1 0305024

(51) Int. Cl.
*H01R 13/62* (2006.01)
(52) U.S. Cl. ...................... 439/157; 439/153
(58) Field of Classification Search ......... 439/152–160, 439/372
See application file for complete search history.

(56) References Cited

U.S. PATENT DOCUMENTS 7,013,476 B2 * 3/2006 Volk et al. .................. 720/726

* cited by examiner

*Primary Examiner*—Javaid Nasri
(74) *Attorney, Agent, or Firm*—Steven M. Reiss

(57) ABSTRACT

A card socket assembly includes a base defining a receiving cavity, and a slider including a card slot configured for securing a data card therein. The slider is slidably received in the receiving cavity, to make the data card secured in the receiving cavity or removed out of the receiving cavity with sliding of the slider.

14 Claims, 6 Drawing Sheets

CARD SOCKET ASSEMBLY

BACKGROUND

1. Technical Field

The present disclosure relates to card socket assemblies and, particularly, to a card socket assembly used in a portable electronic device, e.g., mobile phone, personal digital assistant (PDA), palm computer and etc.

2. Description of Related Art

A typical card socket assembly includes a card slot defined in a housing of a portable electronic device. The card socket assembly further includes a securing means used to secure a data card within the card slot.

However, to remove the data card from the card slot, a user has to apply a large force on the data card against a securing force of the securing means. Thus, it's easy to break the data card and the securing means, and inconvenient for use.

Therefore, there is room for improvement within the art.

BRIEF DESCRIPTION OF THE DRAWINGS

Many aspects of the card socket assembly can be better understood with reference to the following drawings. These drawings are not necessarily drawn to scale, the emphasis instead being placed upon clearly illustrating the principles of the present card socket assembly. Moreover, in the drawings like reference numerals designate corresponding sections throughout the several views.

DETAILED DESCRIPTION

Figure 1:
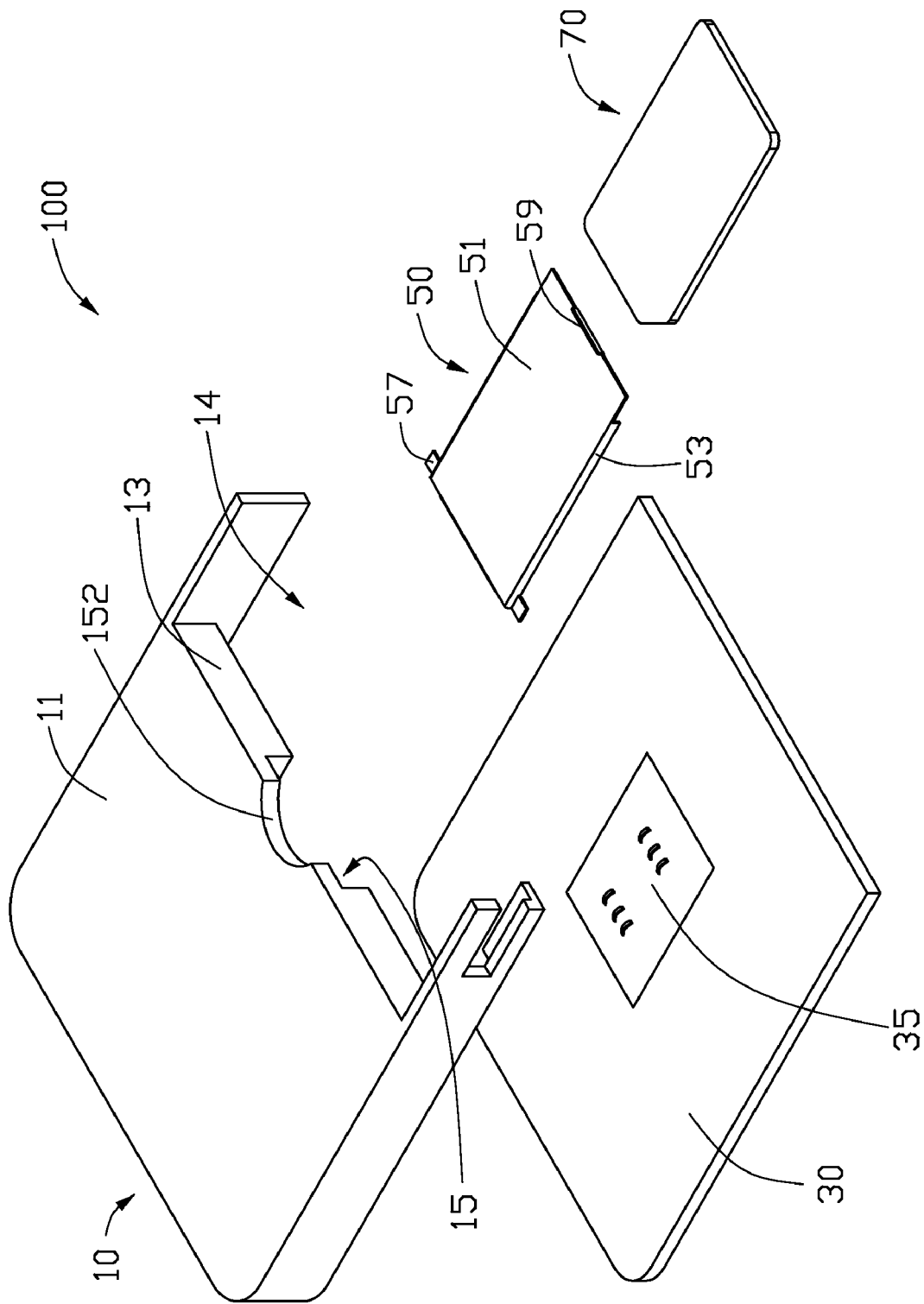
FIG. 1 is an exploded, isometric view of a card socket assembly, in accordance with an exemplary embodiment.
Figure 2:
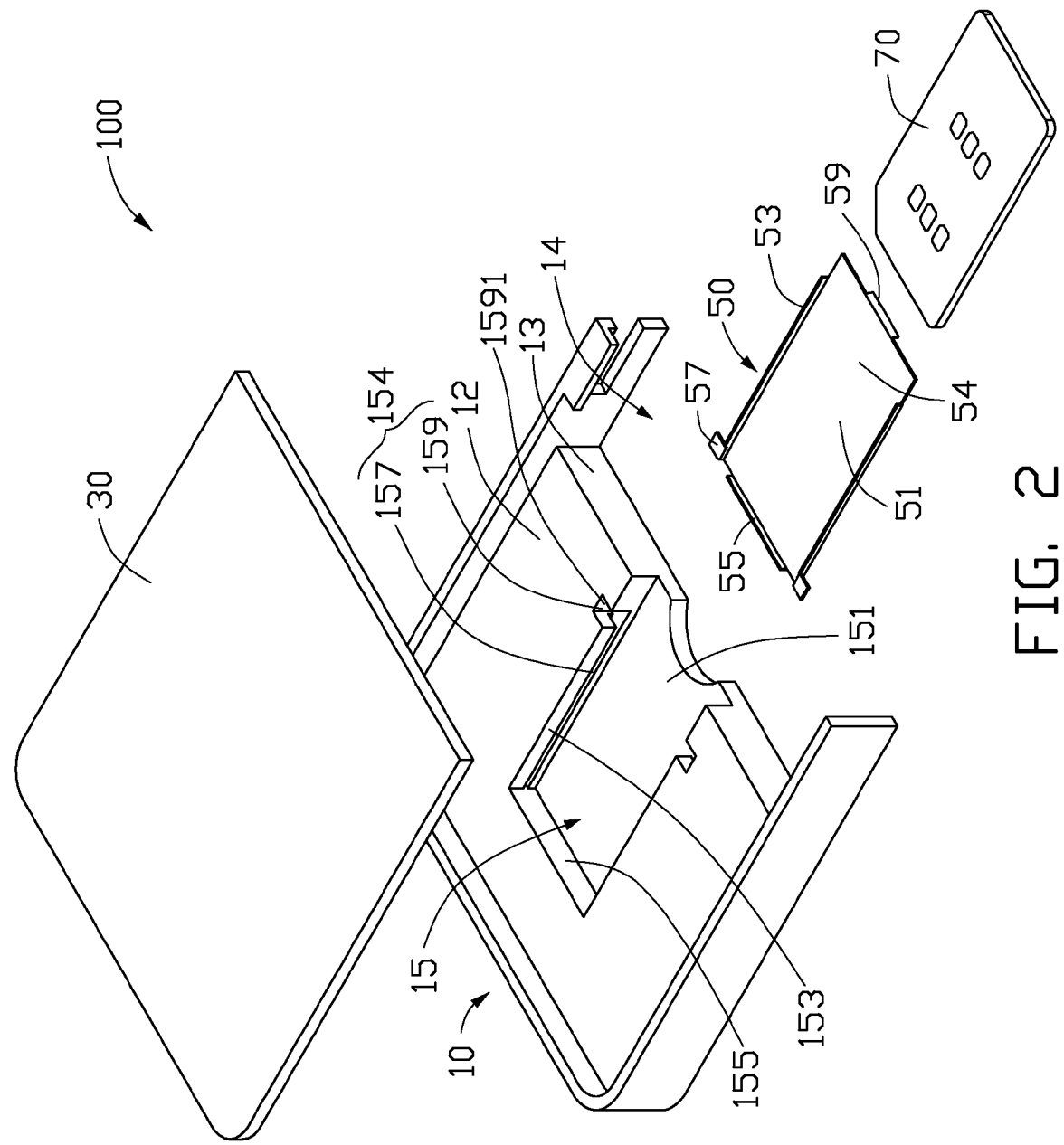
FIG. 2 is similar to FIG. 1, but viewed from another aspect.

FIGS. 1 and 2 show an exemplary card socket assembly 100 used in portable electronic devices, such as mobile phone terminals, digital cameras, and others. The card socket assembly 100 includes a base 10, a bottom board 30, and a slider 50. The slider 50 is mounted between the base 10 and the bottom board 30.

Figure 3:
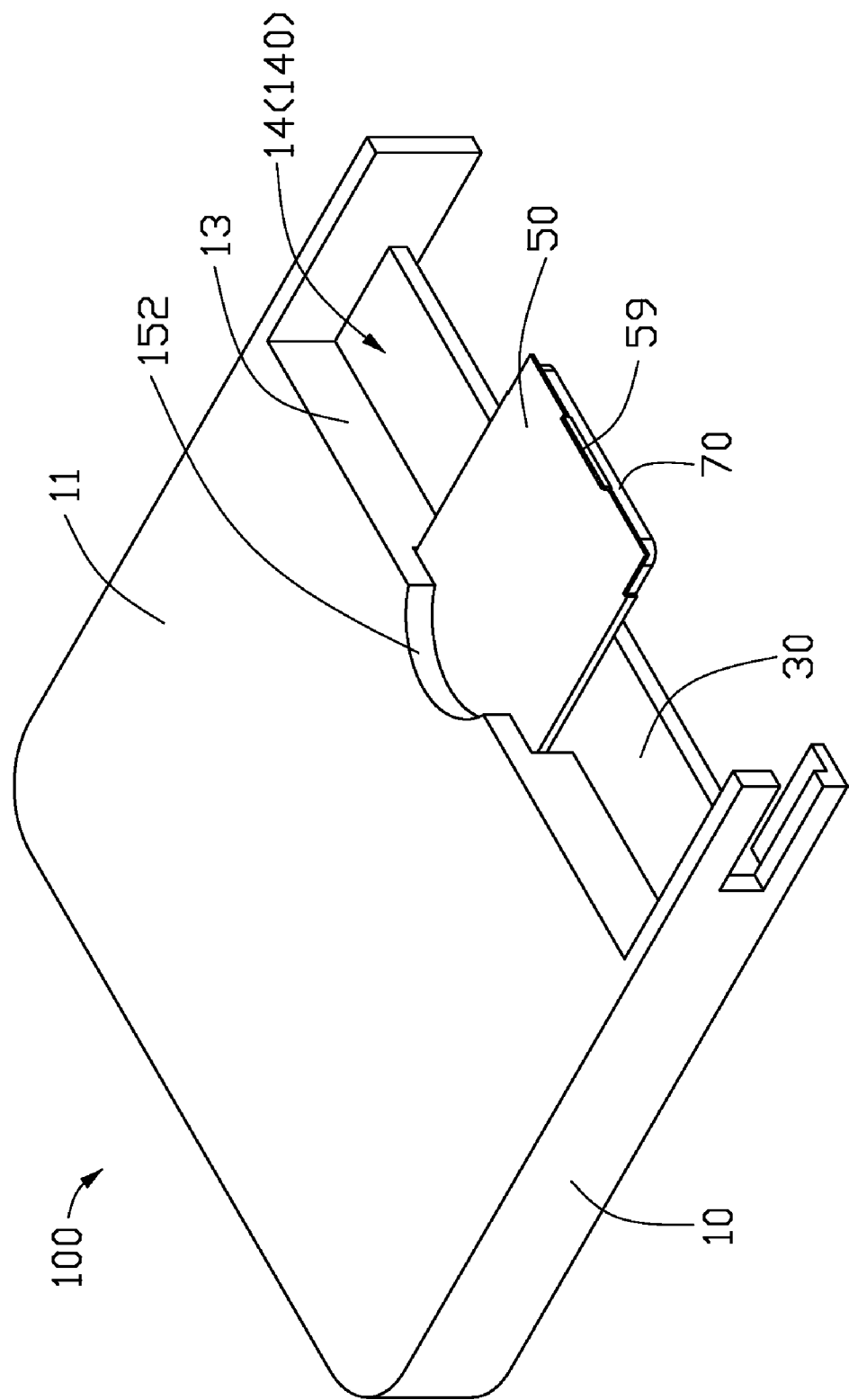
FIG. 3 is an assembled view of the card socket assembly shown in FIG. 2.
Figure 4:
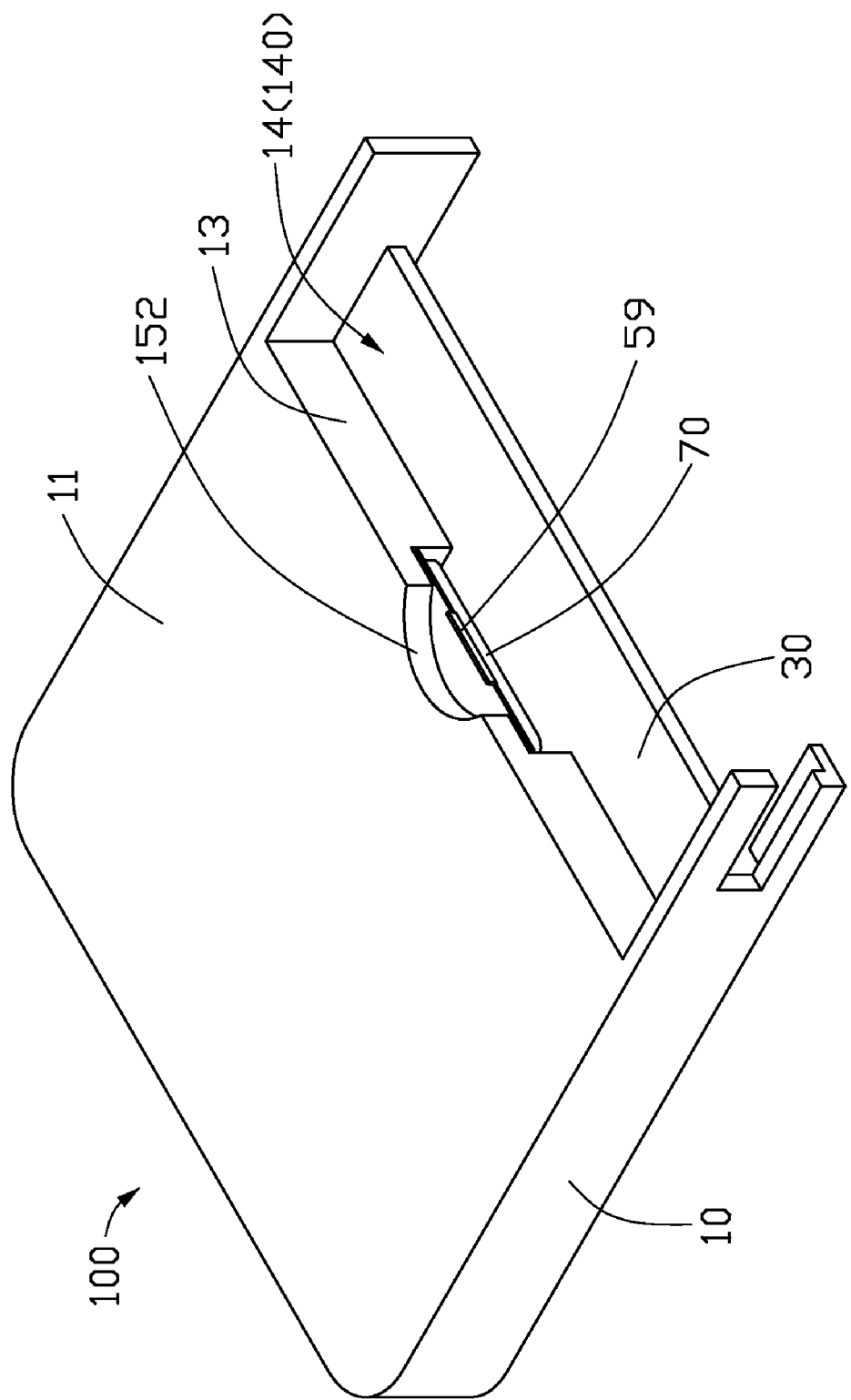
FIG. 4 is similar to FIG. 3, but viewed from another aspect.

The base 10 can be a portion of a housing of a mobile phone. The base 10 includes an interior surface 12, an exterior surface 11 opposite to the interior surface 12, and a side surface 13 perpendicular to the interior surface 12 and the exterior surface 11. In this exemplary embodiment, the base 10 partially defines a cutout 14 through the interior surface 12 and the exterior surface 11, thus forming the side surface 13 facing the cutout 14. When the bottom board 30 is mounted to the interior surface 12 of the base 10, the side surface 13, and the bottom board 30 partially encloses a battery receiving space 140 (see FIG. 3). The base 10 defines a receiving cavity 15 on the interior surface 12, adjacent to the side surface 13. The receiving cavity 15 is communicated with the cutout 14, and enclosed by a bottom wall 151, two parallel guiding walls 153, and a resisting wall 155 opposite to the side surface 13. The bottom wall 151 defines a gap 152 by cutting a portion of the bottom wall 151. The gap 152 is arched and adjacent to the cutout 14. The gap 152 is used to facilitate the slider 50 to slide. Each guiding wall 153 defines a guiding slot 154, used to receive the slider 50 therein. Each guiding slot 154 includes a first slot section 157 and a second slot section 159. The first slot section 157 is parallel with the interior surface 12. The second slot section 159 communicates with one end of the first slot section 157 adjacent to the cutout 14 and is defined in the interior surface 12, thus forming an opening 1591 on the interior surface 12.

The bottom board 30 can be a printed circuit board (PCB). The bottom board 30 includes a connector 35, corresponding to the receiving cavity 15. When the bottom board 30 is mounted to the interior surface 12 of the base 10, the connector 35 is exposed within the receiving cavity 15.

The slider 50 is a generally rectangular shelf. The slider 50 is slidably mounted in the receiving cavity 15 of the base 10. The slider 50 includes a main portion 51, two clamping walls 53, a pushing wall 55, two guiding blocks 57, and an operating portion 59. The main portion 51 is a generally rectangular board, and configured to be receivable in the receiving cavity 15. The two clamping walls 53 are formed by perpendicularly bending both opposite sides of the main portion 51. The pushing wall 55 is formed by perpendicularly bending a third side of the main portion 51. The main portion 51, the two clamping walls 53 and the pushing wall 55 enclose a card slot 54, used to assemble a data card 50 therein. The operating portion 59 is formed by perpendicularly bending the fourth side of the main portion towards the exterior surface 11, opposite to the pushing wall 55. The operating portion 59 can be exposed in the gap 152, thus facilitating the operation of the slider 50. The two guiding blocks 57 are located on the clamping walls 53 adjacent to the pushing wall 55, and configured to be slidably receivable in the first slot section 157 through the second slot section 159. The two guiding blocks 57 are fastened to the two clamping walls 53 adjacent to the pushing wall 55.

Figure 5:
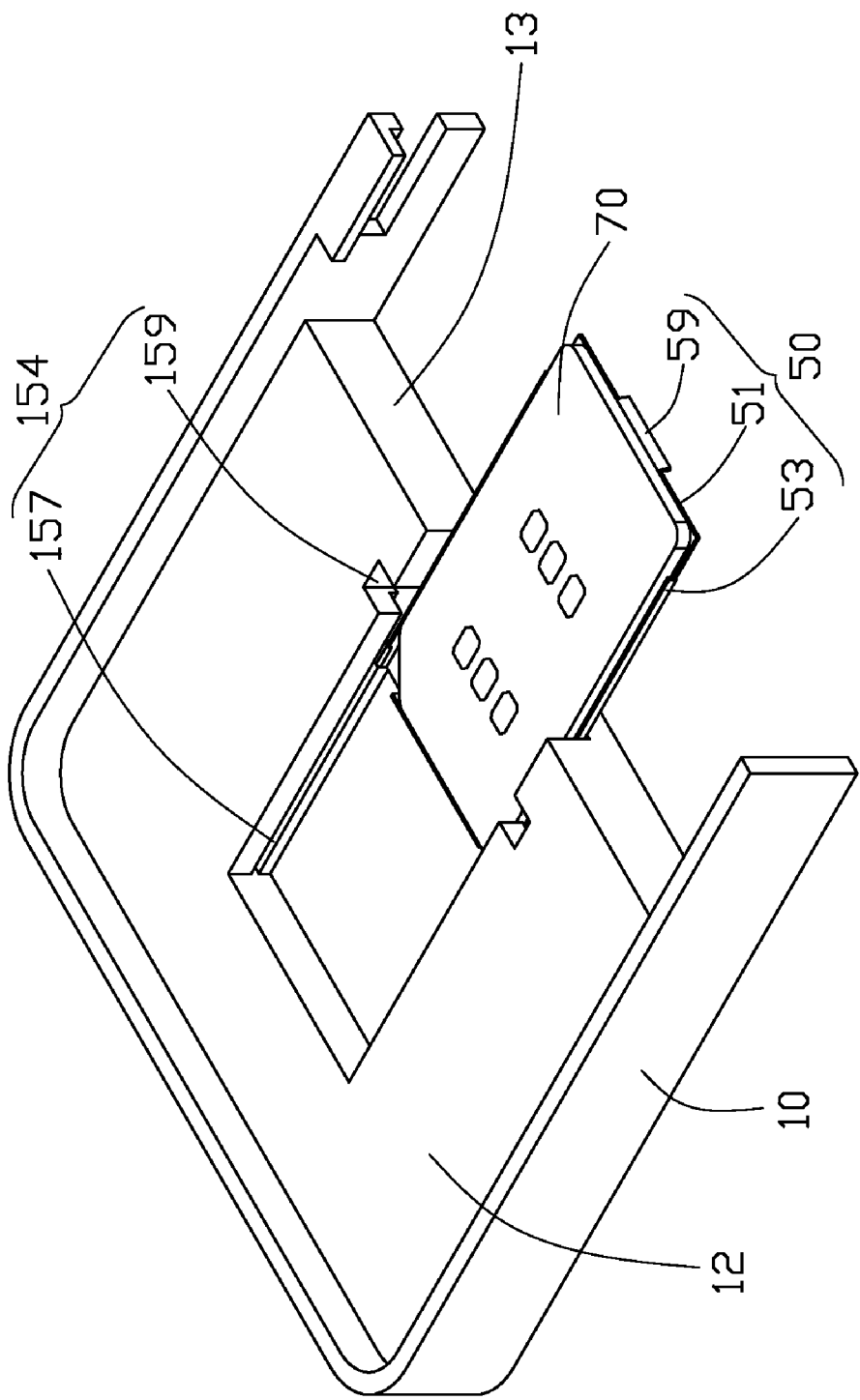
FIG. 5 is a schematic view of the card socket assembly without the bottom board showing the first position of a data card during assembly.
Figure 6:
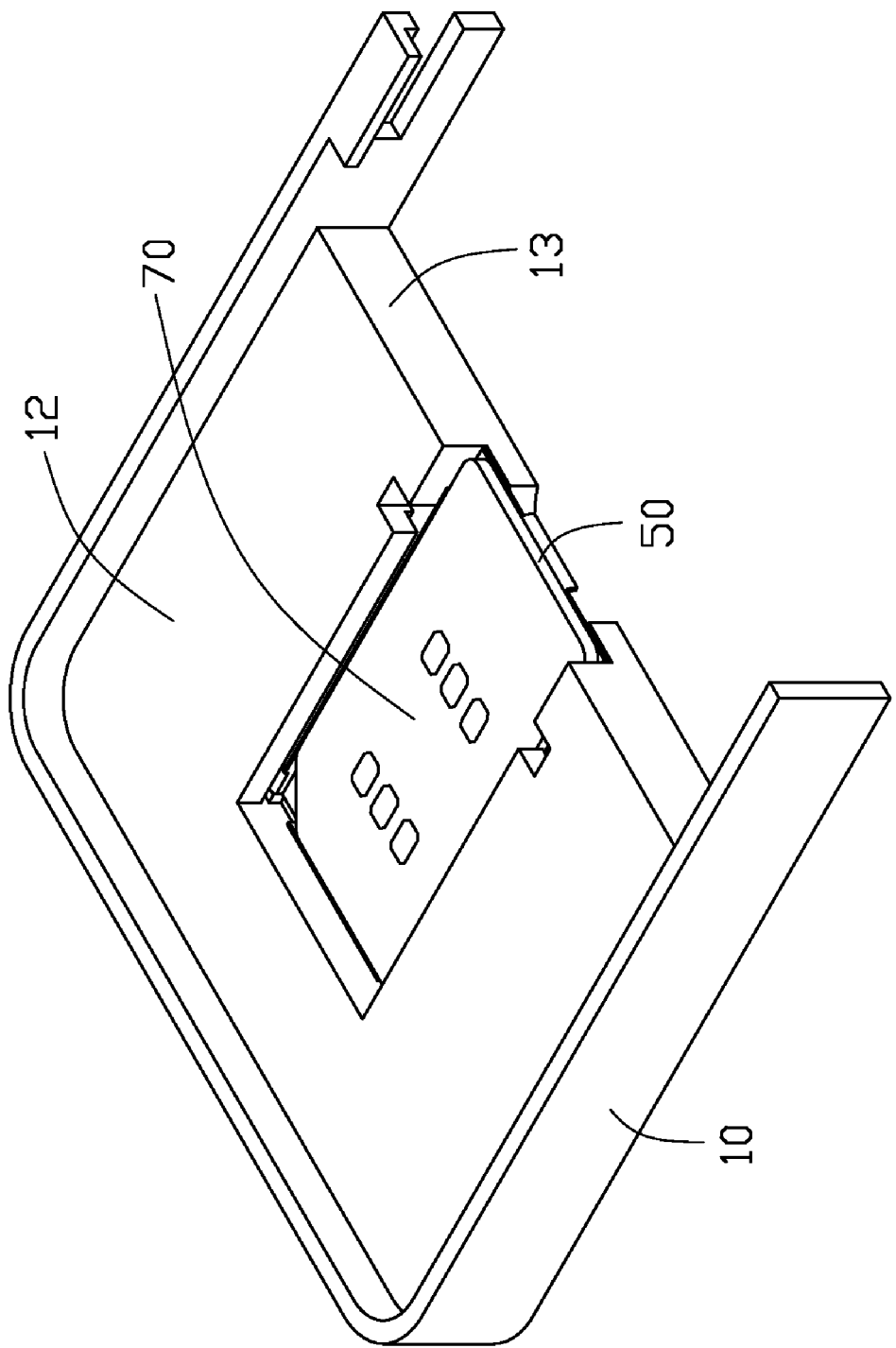
FIG. 6 is similar to FIG. 5, but showing the second position of the data card during assembly.

Referring to FIGS. 5 and 6 together, in assembly, the slider 50 is placed above the interior surface 12, with the two guiding blocks 57 aligned with the two second slot sections 159. Then the two guiding blocks 57 are pushed towards the two first slot sections 157 through the second slot sections 159, thus the slider 50 is slidably received in the first guiding slot section 157. Then the bottom board 30 is fastened to the interior surface 12, with the connector 35 exposed within the receiving cavity by typical fastening means, e.g., screws or hot-melting.

In use, a force is applied on the operating portion 59 to drag the slider 50 to partially slide out of the receiving cavity 15, then the data card 70 is inserted into the card slot 54. At this time, another force is applied on the operating portion 59 towards the resisting wall 155, thus pushing the data card 70 until the data card 70 is completely received in the receiving cavity 15 together with the slider 50 and electrically contacted with the connector 35.

The card socket assembly 100 is simple in configuration, and users can easily secure the data card 70 to the receiving cavity 15 and remove the data card out of the receiving cavity via the slider 50, without destroying the data card 70.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A card socket assembly comprising:

a base defining a receiving cavity, the receiving cavity including two parallel guiding walls, each guiding wall having a guiding slot defined therein; and a slider including a card slot configured for securing a data card therein, a main portion having two opposite first and second sides and a third side, a pushing wall formed by bending the third side, and two guiding blocks fastened to the first and second sides adjacent to the pushing wall, the two guiding blocks being slidably received in the guiding slots thereby the slider being slidably received in the receiving cavity to make the data card secured in the receiving cavity or removed from the receiving cavity by sliding the slider.

2. The card socket assembly as claimed in claim 1, wherein the slider further includes two clamping walls formed by bending the first and second sides of the main portion, the two clamping walls, the main portion and the pushing wall enclose the card slot.

3. The card socket assembly as claimed in claim 2, wherein the receiving cavity further includes a bottom wall and a resisting wall, the receiving cavity being enclosed by the bottom wall, the two parallel guiding walls, and the resisting wall.

4. The card socket assembly as claimed in claim 3, wherein each guiding slot includes a first slot section and a second slot section, the first slot section is parallel with the bottom wall, the second slot section is perpendicular with the first slot section and communicated with the first slot section, the two guiding blocks are inserted into the first slot sections through the second slot sections.

5. The card socket assembly as claimed in claim 3, wherein the slider further includes an operating portion, the operating portion is formed by bending the fourth side of the main portion, and opposite to the pushing wall, the bottom wall defines a gap, the operating portion is exposed in the gap, thus facilitating the operation of the slider.

6. The card socket assembly as claimed in claim 5, wherein the base further defines a cutout communicating with the receiving cavity, the gap is communicated with the cutout.

7. The card socket assembly as claimed in claim 1, wherein the base is a housing of a portable electronic device.

8. A card socket assembly comprising:

a base defining a receiving cavity, the receiving cavity including two parallel guiding walls, each guiding wall having a guiding slot defined therein;

a slider including a card slot configured for securing a data card therein, a main portion having two opposite first and second sides and a third side, a pushing wall formed by bending the third side, and two guiding blocks fastened to the first and second sides adjacent to the pushing wall, the two guiding blocks being slidably received in the guiding slots thereby the slider being slidably received in the receiving cavity to make the data card secured in the receiving cavity or removed from the receiving cavity by sliding the slider; and a bottom board including a connector, the connector being exposed within the receiving cavity, the data card being electrically contacted with the connector.

9. The card socket assembly as claimed in claim 8, wherein the slider further includes two clamping walls formed by bending the two opposite first and second sides of the main portion, the two clamping walls, the main portion and the pushing wall enclose the card slot.

10. The card socket assembly as claimed in claim 9, wherein the two guiding blocks are fastened to the two clamping walls adjacent to the pushing wall, the receiving cavity further includes a bottom wall and a resisting wall, the receiving cavity being enclosed by the bottom wall, the two parallel guiding walls, and the resisting wall.

11. The card socket assembly as claimed in claim 10, wherein the guiding slot includes a first slot section and a second slot section, the first slot section is parallel with the bottom wall, the second slot section is perpendicular with the first slot section and communicated with the first slot section, the two guiding blocks are inserted into the first slot sections through the second slot sections.

12. The card socket assembly as claimed in claim 9, wherein the slider further includes an operating portion, the operating portion is formed by bending the fourth side of the main portion, and opposite to the pushing wall, the bottom wall defines a gap, the operating portion is exposed in the gap, thus facilitating the operation of the slider.

13. The card socket assembly as claimed in claim 12, wherein the base further defines a cutout communicating with the receiving cavity, the gap is communicated with the cutout.

14. The card socket assembly as claimed in claim 8, wherein the base is a housing of a portable electronic device.

* * * * *